(12) United States Patent
Chien et al.

(10) Patent No.: US 11,334,339 B2
(45) Date of Patent: May 17, 2022

(54) USB DEVICE AND FIRMWARE UPDATING METHOD THEREOF

(71) Applicant: Primax Electronics Ltd., Taipei (TW)

(72) Inventors: Chih-Feng Chien, Taipei (TW); Yun-Jung Lin, Taipei (TW); Chien-Nan Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 316 days.

(21) Appl. No.: 16/695,409

(22) Filed: Nov. 26, 2019

(65) Prior Publication Data

US 2021/0049000 A1    Feb. 18, 2021

(30) Foreign Application Priority Data

Aug. 16, 2019   (TW) ................................. 108129300

(51) Int. Cl.
*G06F 8/65*    (2018.01)
*G06F 13/42*   (2006.01)

(52) U.S. Cl.
CPC ............ *G06F 8/65* (2013.01); *G06F 13/4282* (2013.01); *G06F 2213/0016* (2013.01); *G06F 2213/0042* (2013.01)

(58) Field of Classification Search
CPC ........... G06F 8/65; G06F 8/71; G06F 13/4282
See application file for complete search history.

(56) References Cited

U.S. PATENT DOCUMENTS

| | | | | |
|---|---|---|---|---|
| 7,185,135 B1 * | 2/2007 | Briggs | ................ | G06F 13/4027 710/313 |
| 10,776,102 B1 * | 9/2020 | Dsouza | .................... | G06F 21/78 |
| 2012/0331202 A1 * | 12/2012 | Cohen | ................... | G06F 13/102 710/313 |

* cited by examiner

*Primary Examiner* — Duy Khuong T Nguyen
(74) *Attorney, Agent, or Firm* — Kirton McConkie; Evan R. Witt (57) ABSTRACT

A USB device and a firmware updating method for the USB device are provided. The firmware updating method includes the following steps. Firstly, a communication protocol is provided. Then, the communication protocol is installed in the at least one microcontroller unit of the USB device. Then, an application program is produced according to the communication protocol. The application program is installed in an electronic computer. The application program contains at least one update firmware information. Then, the at least one update firmware information is transmitted from the electronic computer to the at least one microcontroller unit through the communication protocol. Consequently, at least one original firmware information in the at least one microcontroller unit is replaced by the at least one update firmware information.

9 Claims, 9 Drawing Sheets

USB DEVICE AND FIRMWARE UPDATING METHOD THEREOF

FIELD OF THE INVENTION

The present invention relates to an electronic device, and more particularly to a universal serial bus (USB) device and a firmware updating method thereof.

BACKGROUND OF THE INVENTION

Due to the invention and prevalence of the universal serial bus (USB) interface, the conventional communication interface (e.g., a COM port) on early electronic computers has been eliminated gradually. Nowadays, most computer peripheral devices can be connected with an electronic computer through the universal serial bus interfaces in order to implement various communications and applications. For example, a firmware updating method of the computer peripheral device can be performed through the USB interface.

Figure 1:
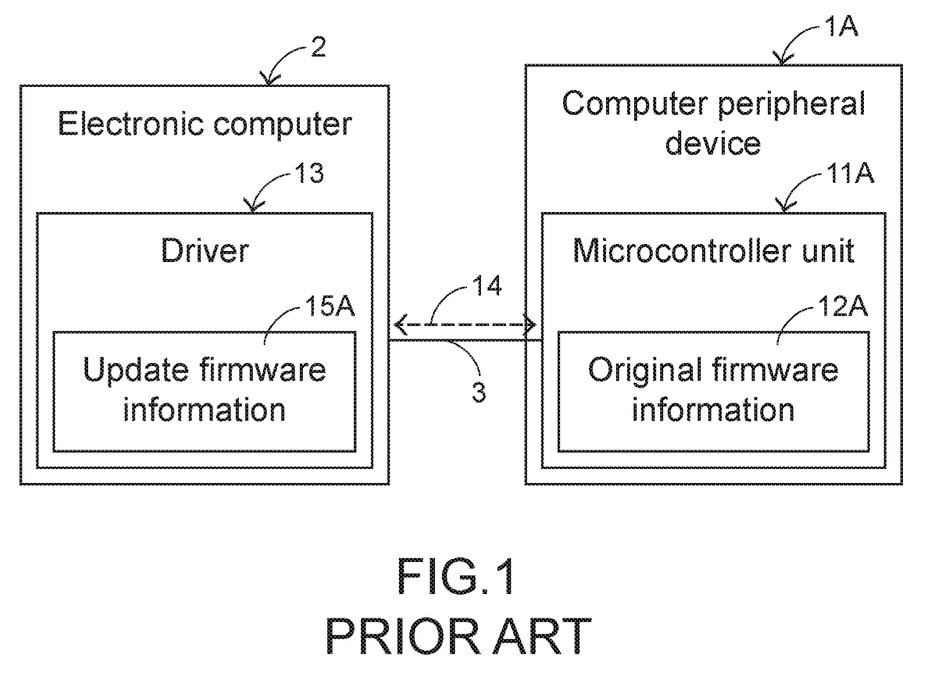
FIG. 1 schematically illustrates a concept of performing a firmware updating method for a conventional computer peripheral device.

FIG. 1 schematically illustrates a concept of performing a firmware updating method for a conventional computer peripheral device. The computer peripheral device 1A comprises a microcontroller unit 11A. The microcontroller unit 11A is used for processing an electronic signal and allowing the computer peripheral device 1A to provide a specified electronic function. The microcontroller unit 11A contains original firmware information 12A. Moreover, the microcontroller unit 11A can be connected with an electronic computer 2 through a universal serial bus interface 3. For performing a firmware updating method on the computer peripheral device 1A, a driver 13 is firstly downloaded into the electronic computer 2 and the driver 13 is executed. After the driver 13 is executed, the driver 13 establishes a simulated UART interface between the electronic computer 2 and the computer peripheral device 1A. Consequently, the computer peripheral device 1A is considered as a communication channel 14 of a COM port device by the electronic computer 2. Then, the update firmware information 15A that is stored in or download to the electronic computer 2 is transmitted to the computer peripheral device 1A through the established communication channel 14. Consequently, the original firmware information 12A in the computer peripheral device 1A is replaced by the update firmware information 15A. Afterwards, the established communication channel 14 is removed, and the firmware updating method is completed. The process of removing the communication channel 14 may be manually done or automatically performed through the execution of the driver 13. The technology of performing the firmware updating method is well known to those skilled in the art, and is not redundantly described herein.

Figure 2:
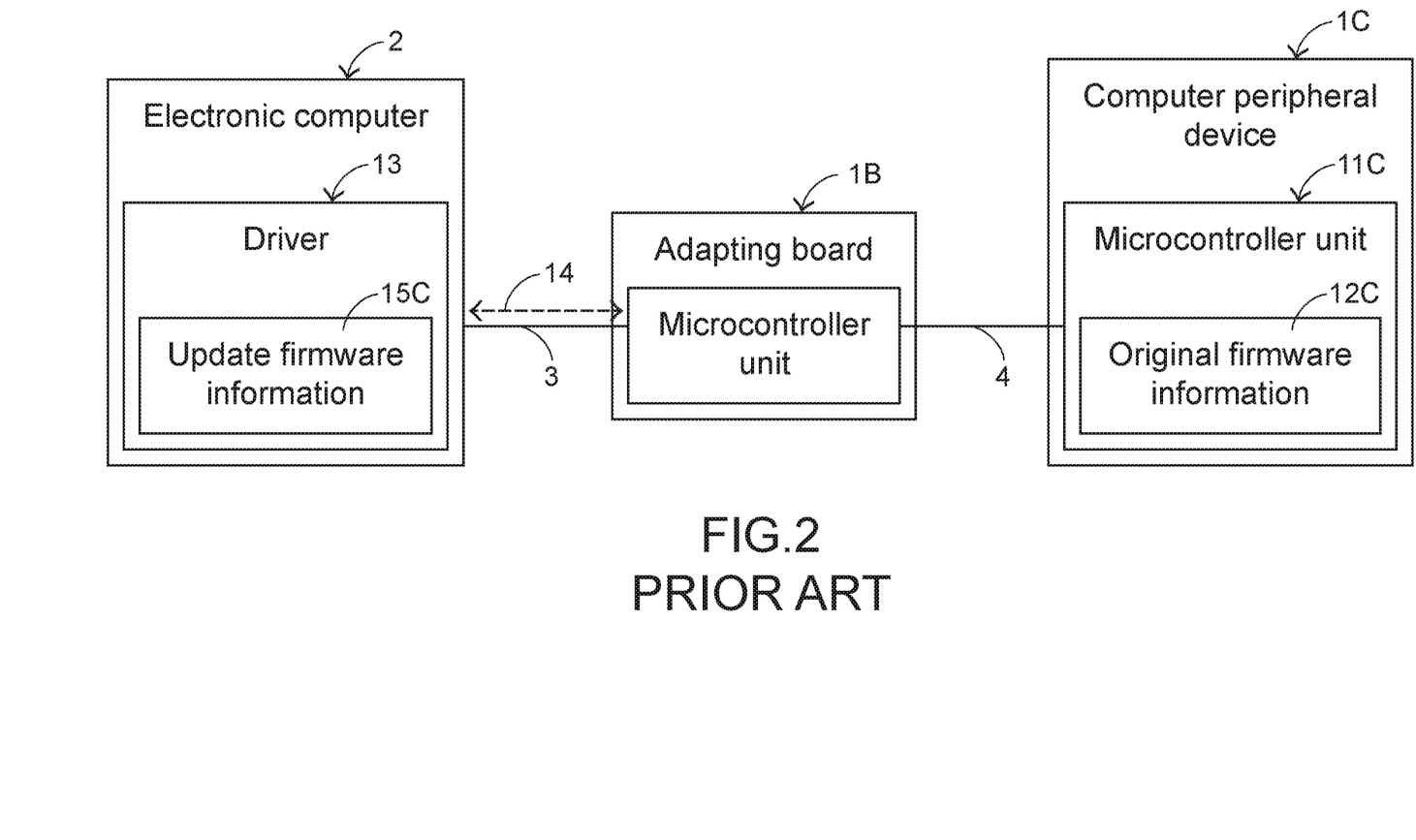
FIG. 2 schematically illustrates another concept of performing a firmware updating method for a conventional computer peripheral device.

In case that the microcontroller unit of the computer peripheral device does not have the capability of connecting to the electronic computer through the universal serial bus interface, it is necessary to use an external cable to implement the firmware updating method. FIG. 2 schematically illustrates another concept of performing a firmware updating method for a conventional computer peripheral device. The microcontroller unit 11C of the computer peripheral device 1C contains original firmware information 12C. However, the microcontroller unit 11C can be connected with the electronic computer 2 through the universal serial bus interface 3. Under this circumstance, it is necessary to use an adapting board 1B to perform the firmware updating method. For example, the adapting board 1B is the computer peripheral device 1A as shown in FIG. 1. As mentioned in FIG. 1, the execution of the driver 13 can transmit the update firmware information 15C from the electronic computer 2 to the adapting board 1B through the temporary communication channel 14. The computer peripheral device 1C has to be connected with the adapting board 1B through another cable 4 (e.g., a RS-232 transmission cable). Then, the update firmware information 15C is transmitted from the adapting board 1B to the computer peripheral device 1C. Consequently, the original firmware information 12C in the computer peripheral device 1C is replaced by the update firmware information 15C.

As mentioned above, the firmware updating method of the conventional computer peripheral device is complicated. Therefore, there is a need of providing an improved firmware updating method in order to overcome the drawbacks of the conventional technologies.

SUMMARY OF THE INVENTION

An object of the present invention provides a firmware updating method for a universal serial bus (USB) device. By the firmware updating method, the firmware in the USB device can be directly updated without the need of executing a driver to establish a temporary communication channel between an electronic computer and at least one microcontroller unit of the USB device.

An object of the present invention provides a USB device using the firmware updating method of the present invention.

In accordance with an aspect of the present invention, a firmware updating method for a USB device with at least one microcontroller unit is provided. The firmware updating method includes the following steps. Firstly, a communication protocol is provided. Then, the communication protocol is installed in the at least one microcontroller unit. Then, an application program is produced according to the communication protocol. The application program is installed in an electronic computer. The application program contains at least one update firmware information. Then, the at least one update firmware information is transmitted from the electronic computer to the at least one microcontroller unit through the communication protocol. Consequently, at least one original firmware information in the at least one microcontroller unit is replaced by the at least one update firmware information.

In accordance with another aspect of the present invention, a USB device is provided. The USB device includes a first microcontroller unit, a second microcontroller unit, a USB microcontroller unit and an application program. The first microcontroller unit contains a first original firmware information. The second microcontroller unit contains a second original firmware information. The USB microcontroller unit is connected with an electronic computer through a USB interface, connected with the first microcontroller unit through a first connection interface, and connected with the second microcontroller unit through a second connection interface. The application program is installed in the electronic computer. The application program contains a first update firmware information and a second update firmware information. The application program and the USB microcontroller unit have the same communication protocol. During a process of updating a firmware of the USB device, the first update firmware information is directly transmitted from the application program to the USB microcontroller unit through the communication protocol and the first update firmware information is written into the first microcontroller unit through the first connection interface so as to replace the first original firmware information. Alternatively, the second update firmware information is directly transmitted from the application program to the USB microcontroller unit through the communication protocol and the second update firmware information is written into the second microcontroller unit through the second connection interface so as to replace the second original firmware information.

In accordance with another aspect of the present invention, a USB device is provided. The USB device includes a USB microcontroller unit and an application program. The USB microcontroller unit is connected with an electronic computer through a USB interface. The USB microcontroller unit contains an original firmware information. The application program is installed in the electronic computer. The application program contains an update firmware information. The application program and the USB microcontroller unit have the same communication protocol, wherein during a process of updating a firmware of the USB device. The update firmware information is directly written into the USB microcontroller unit through the communication protocol by the application program. Consequently, the original firmware information is replaced by the update firmware information.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The embodiments of present invention will be described more specifically with reference to the following drawings. Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 3:
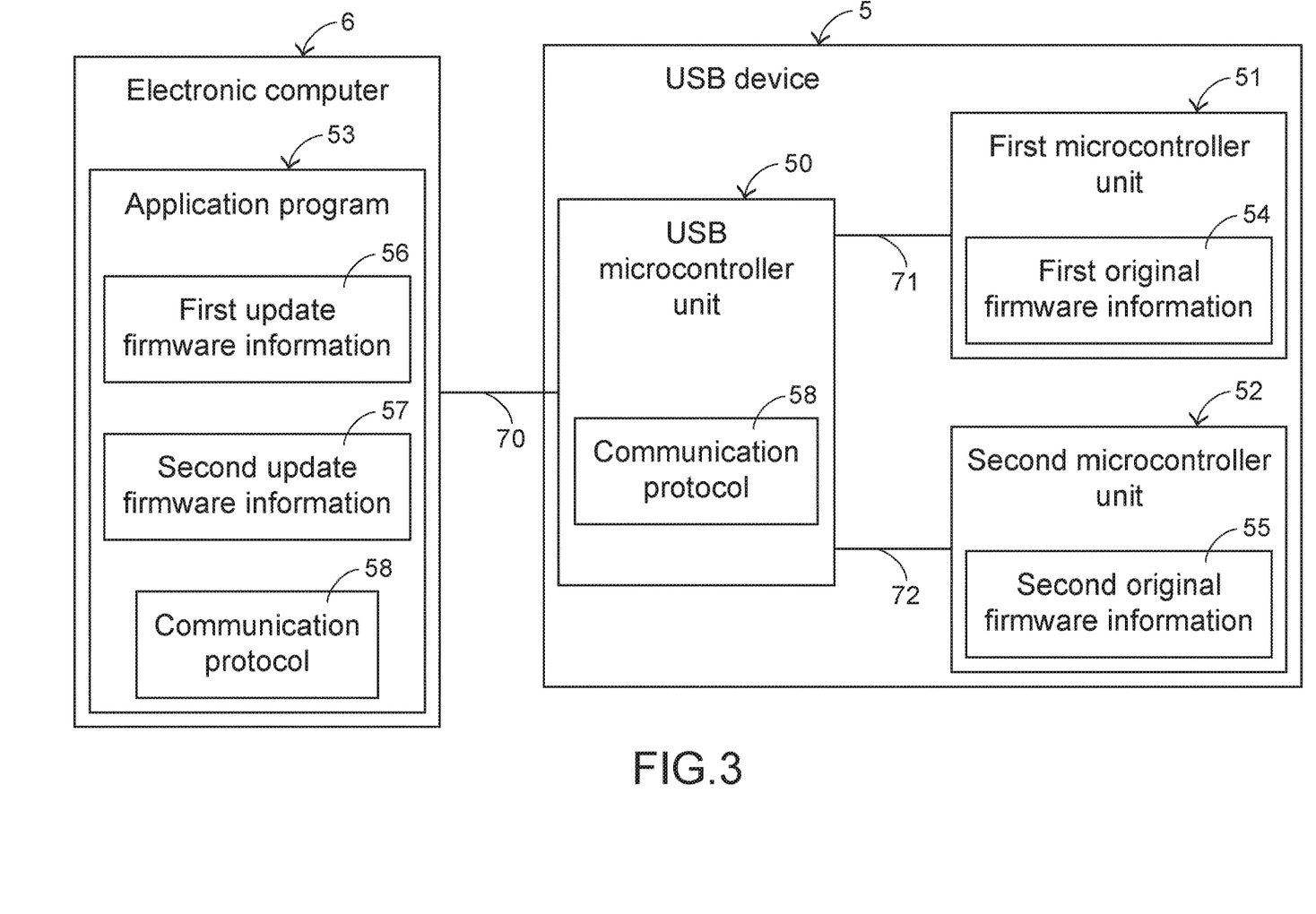
FIG. 3 is a schematic functional block diagram illustrating a USB device according to a first embodiment of the present invention.

FIG. 3 is a schematic functional block diagram illustrating a USB device according to a first embodiment of the present invention. The USB device 5 comprises a universal serial bus microcontroller unit (USB microcontroller unit) 50, a first microcontroller unit 51, a second microcontroller unit 52 and an application program 53. The first microcontroller unit 51 contains first original firmware information 54. The second microcontroller unit 52 contains second original firmware information 55. The USB microcontroller unit 50 is connected with an electronic computer 6 through a USB interface 70. The USB microcontroller unit 50 is connected with the first microcontroller unit 51 through a first connection interface 71. The USB microcontroller unit 50 is connected with the second microcontroller unit 52 through a second connection interface 72. The application program 53 is installed in the electronic computer 6. The application program 53 contains first update firmware information 56 and second update firmware information 57 for replacing the first original firmware information 54 and the second original firmware information 55, respectively. Moreover, the application program 53 and the USB microcontroller unit 50 have the same communication protocol 58.

Preferably, the first connection interface 71 is a UART interface, an I2C interface, a SPI interface or a USB interface, and the second connection interface 72 is a UART interface, an I2C interface, a SPI interface or a USB interface. In an embodiment, the USB device 5 is wireless receiver module that is shared by a wireless mouse (not shown) and a wireless keyboard (not shown). When a signal from the wireless mouse is received by the USB device 5, the signal from the wireless mouse is processed by the first microcontroller unit 51. When a signal from the wireless keyboard is received by the USB device 5, the signal from the wireless keyboard is processed by the second microcontroller unit 52. It is noted that the types of the first connection interface 71, the second connection interface 72 and the USB device 5 are not restricted. That is, the types of the first connection interface 71, the second connection interface 72 and the USB device 5 may be varied according to the practical requirements.

Figure 4:
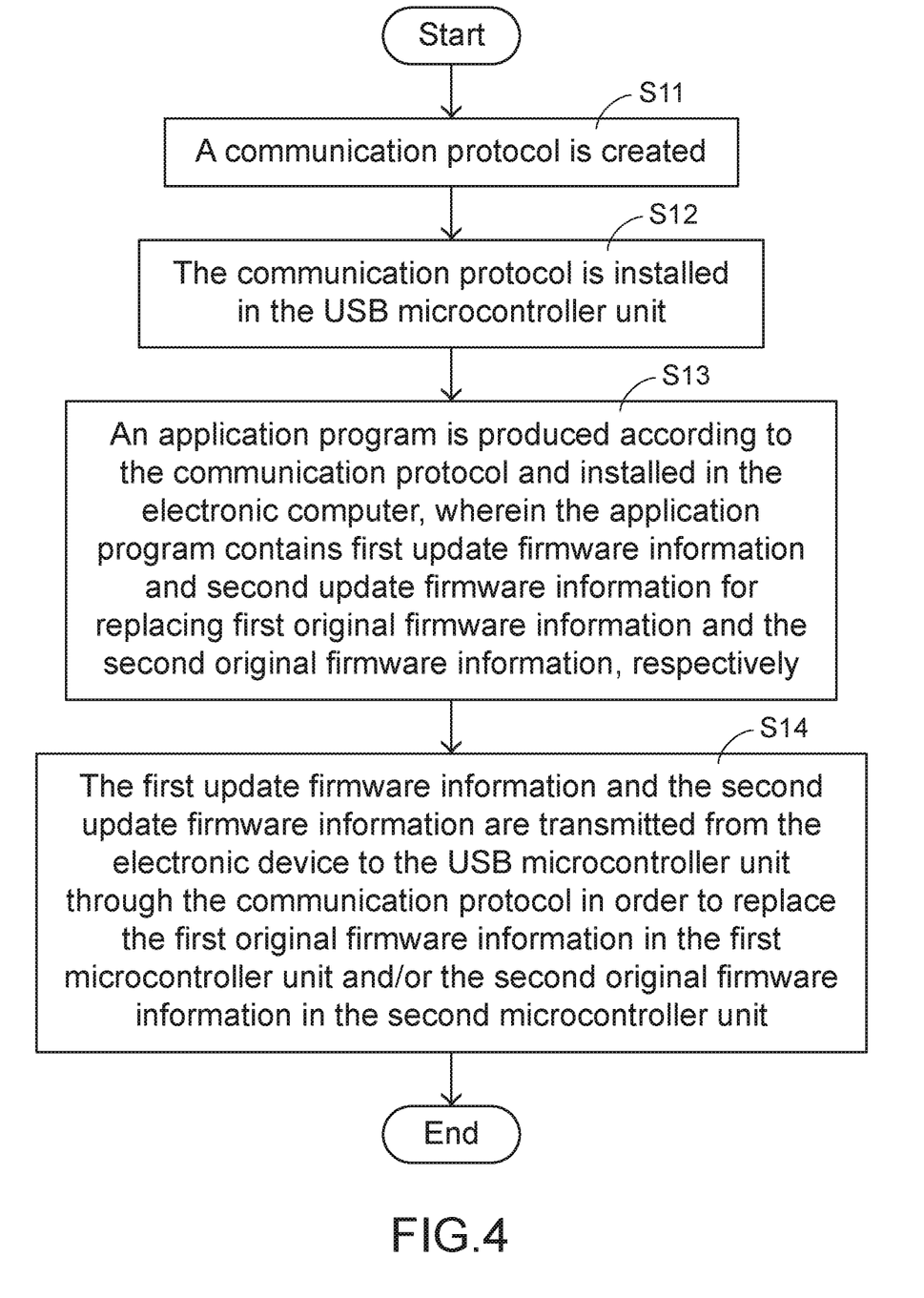
FIG. 4 is a flowchart illustrating a firmware updating method for a USB device according to an embodiment of the present invention.

The present invention further provides a firmware updating method for a USB device. FIG. 4 is a flowchart illustrating a firmware updating method for a USB device according to an embodiment of the present invention.

Firstly, in a step S11, a communication protocol 58 is created. Then, in a step S12, the communication protocol 58 is installed in the USB microcontroller unit 50. That is, the USB microcontroller unit 50 can perform communication through the communication protocol 58, which is created in the step S11. In a step S13, an application program 53 is produced according to the communication protocol 58. The application program 53 is installed in the electronic computer 6, and thus the electronic device 6 can perform communication through the communication protocol 58. The application program 53 that is produced in the step S13 contains first update firmware information 56 and second update firmware information 57 for replacing first original firmware information 54 and second original firmware information 55, respectively. In a step S14, the first update firmware information 56 and the second update firmware information 57 are transmitted from the electronic device 6 to the USB microcontroller unit 50 through the communication protocol 58 in order to replace the first original firmware information 54 in the first microcontroller unit 51 and/or the second original firmware information 55 in the second microcontroller unit 52. Especially, while the firmware updating method of FIG. 4 is performed, the USB device 5 is always considered as a human interface device (HID) by the electronic device 6.

Figure 5A:
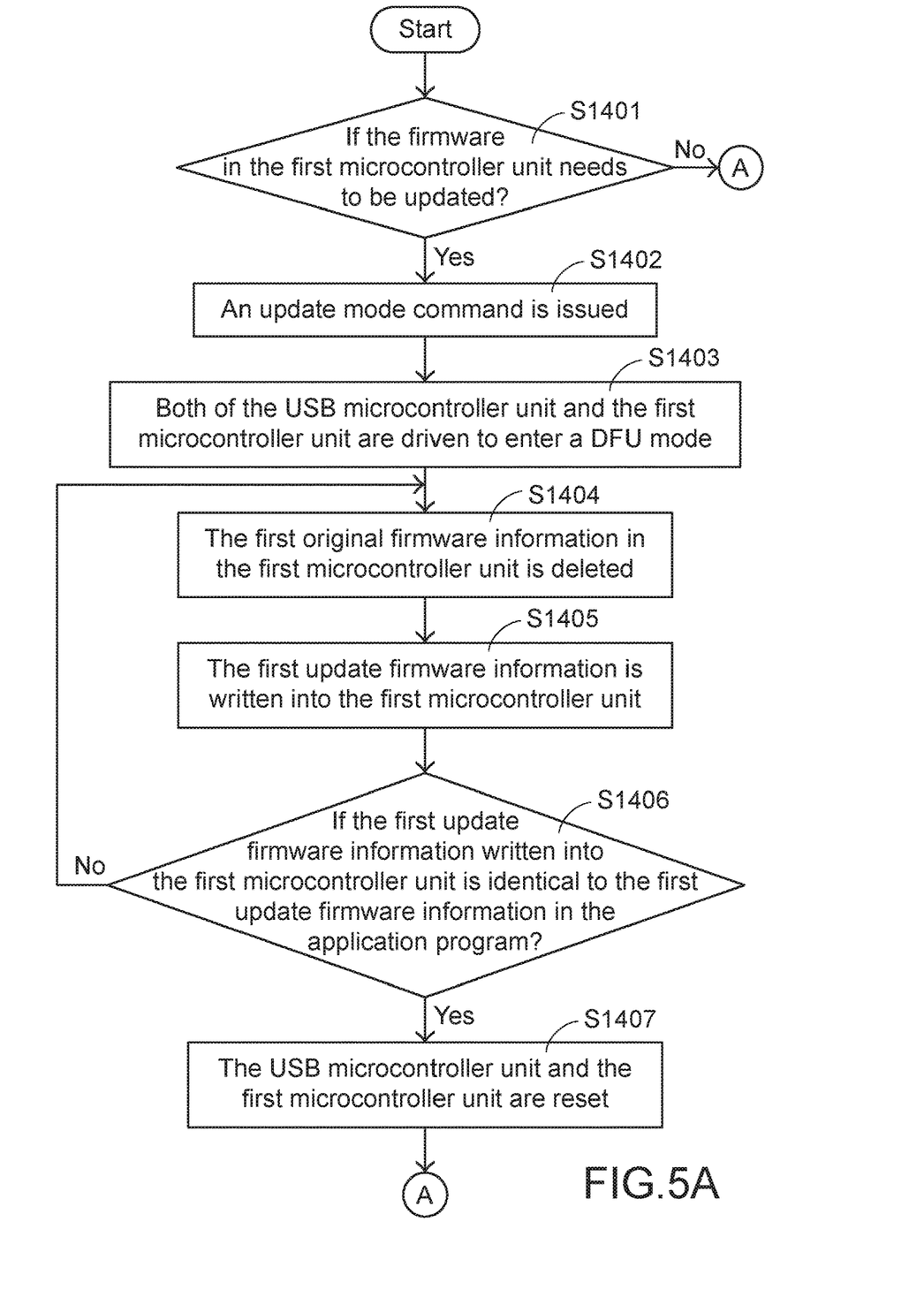
FIGS. 5A and 5B illustrate the detailed procedure of the step S14 in the firmware updating method of FIG. 4.

The detailed procedure of the step S14 will be described as follows. FIGS. 5A and 5B illustrate the detailed procedure of the step S14 in the firmware updating method of FIG. 4. While the user intends to update the firmware and the application program 53 installed in the electronic device 6 is executed, the application program 53 firstly judges whether the firmware in the first microcontroller unit 51 needs to be updated (Step S1401 of FIG. 5A). In an embodiment, the application program 53 judges whether the first update firmware information 56 and the first original firmware information 54 are identical. If the first update firmware information 56 and the first original firmware information 54 are different, the application program 53 judges that the firmware in the first microcontroller unit 51 needs to be updated. Then, the application program 53 issues an update mode command (Step S1402 of FIG. 5A). The update mode command is directly transmitted to the USB microcontroller unit 50 through the communication protocol 58, which is created in the step S11 of FIG. 4. Consequently, both of the USB microcontroller unit 50 and the first microcontroller unit 51 are driven to enter a device firmware upgrade (DFU) mode (Step S1403 of FIG. 5A).

Then, the first original firmware information 54 in the first microcontroller unit 51 is deleted by the USB microcontroller unit 50 (Step S1404 of FIG. 5A). Then, the first update firmware information 56 transmitted through the communication protocol 58 is written into the first microcontroller unit 51 (Step S1405 of FIG. 5A). That is, the first update firmware information 56 is transmitted from the USB microcontroller unit 50 to the first microcontroller unit 51 through the first connection interface 71. After the first update firmware information 56 is written into the first microcontroller unit 51, the application program 53 and at least one of the USB microcontroller unit 50 and the first microcontroller unit 51 will check whether the first update firmware information 56 written into the first microcontroller unit 51 is identical to the first update firmware information 56 in the application program 53 (Step S1406 of FIG. 5A). If the first update firmware information 56 written into the first microcontroller unit 51 and the first update firmware information 56 in the application program 53 are identical, the USB microcontroller unit 50 and the first microcontroller unit 51 are reset (Step S1407 of FIG. 5A). Whereas, if the first update firmware information 56 written into the first microcontroller unit 51 and the first update firmware information 56 in the application program 53 are different, the steps S1404, S1405 and S1406 are repeatedly done.

Figure 5B:
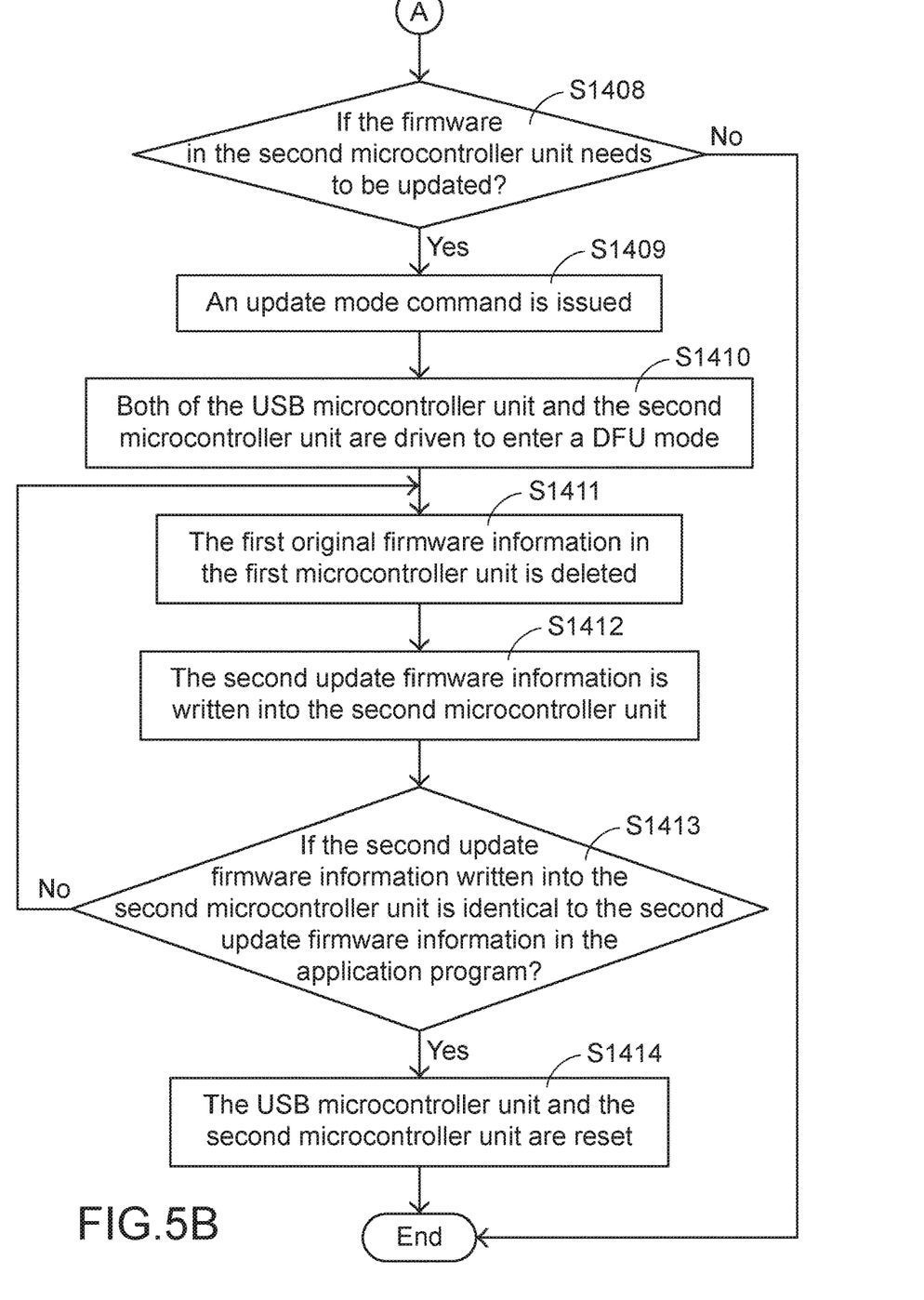

On the other hand, if the application program 53 judges that the firmware in the first microcontroller unit 51 does not need to be updated in the step S1401 or the USB microcontroller unit 50 and the first microcontroller unit 51 are reset in the step S1407, the application program 53 judges whether the firmware in the second microcontroller unit 52 needs to be updated (Step S1408 of FIG. 5B). In an embodiment, the application program 53 judges whether the second update firmware information 57 and the second original firmware information 55 are identical. If the second update firmware information 57 and the second original firmware information 55 are different, the application program 53 judges that the firmware in the second microcontroller unit 52 needs to be updated. Then, the application program 53 issues an update mode command (Step S1409 of FIG. 5B). The update mode command is directly transmitted to the USB microcontroller unit 50 through the communication protocol 58, which is created in the step S11 of FIG. 4. Consequently, both of the USB microcontroller unit 50 and the second microcontroller unit 52 are driven to enter a device firmware upgrade (DFU) mode (Step S1410 of FIG. 5B).

Then, the second original firmware information 55 in the second microcontroller unit 52 is deleted by the USB microcontroller unit 50 (Step S1411 of FIG. 5B). Then, the second update firmware information 57 transmitted through the communication protocol 58 is written into the second microcontroller unit 52 (Step S1412 of FIG. 5B). That is, the second update firmware information 57 is transmitted from the USB microcontroller unit 50 to the second microcontroller unit 52 through the second connection interface 72. After the second update firmware information 57 is written into the second microcontroller unit 52, the application program 53 and at least one of the USB microcontroller unit 50 and the second microcontroller unit 52 will check whether the second update firmware information 57 written into the second microcontroller unit 52 is identical to the second update firmware information 57 in the application program 53 (Step S1413 of FIG. 5B). If the second update firmware information 57 written into the second microcontroller unit 52 and the second update firmware information 57 in the application program 53 are identical, the USB microcontroller unit 50 and the second microcontroller unit 52 are reset (Step S1414 of FIG. 5B). Whereas, if the second update firmware information 57 written into the second microcontroller unit 52 and the second update firmware information 57 in the application program 53 are different, the steps S1411, S1412 and S1413 are repeatedly done.

Figure 6:
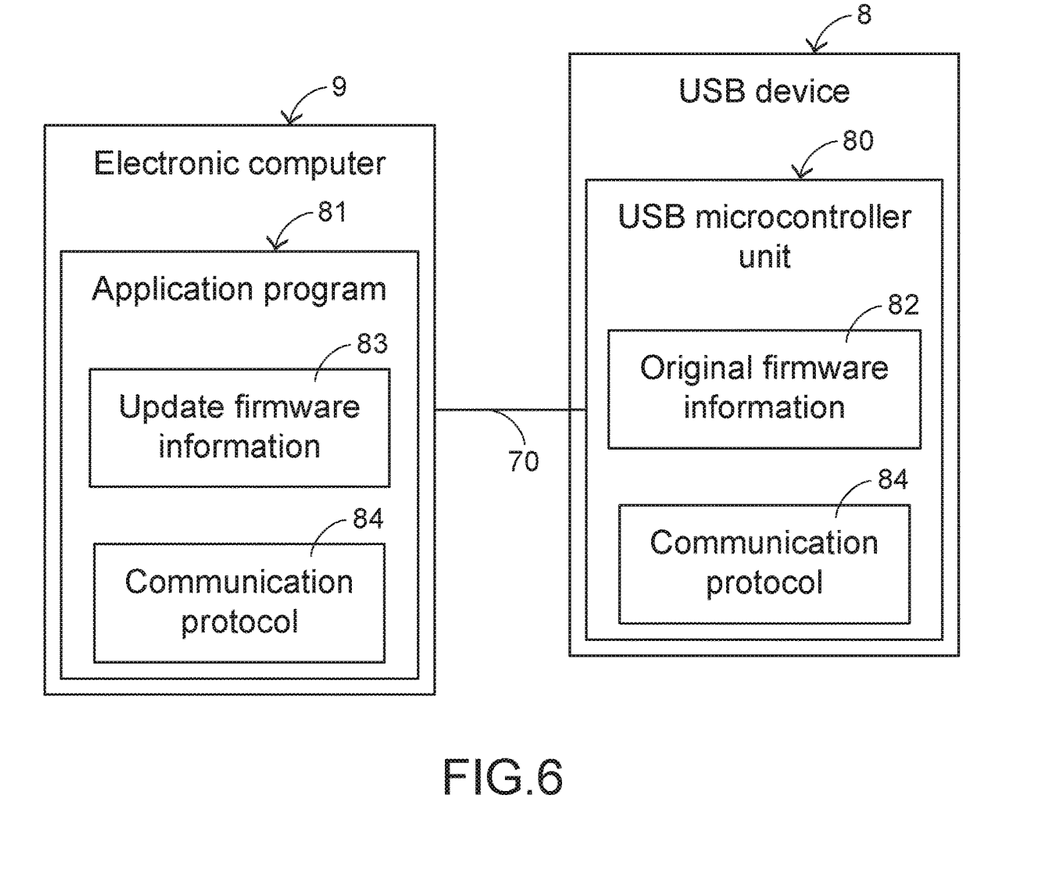
FIG. 6 is a schematic functional block diagram illustrating a USB device according to a second embodiment of the present invention.

FIG. 6 is a schematic functional block diagram illustrating a USB device according to a second embodiment of the present invention. The USB device 8 comprises a universal serial bus microcontroller unit (USB microcontroller unit) 80 and an application program 81. The USB microcontroller unit 80 contains original firmware information 82. The USB microcontroller unit 80 is connected with an electronic computer 9 through a USB interface 70. The application program 81 is installed in the electronic computer 9. The application program 81 contains update firmware information 83 for replacing the original firmware information 82. Moreover, the application program 81 and the USB microcontroller unit 80 have the same communication protocol 84. In an embodiment, the USB device 8 is wireless receiver module that is shared by a wireless mouse (not shown) and a wireless keyboard (not shown). It is noted that the example of the USB device is not restricted.

Figure 7:
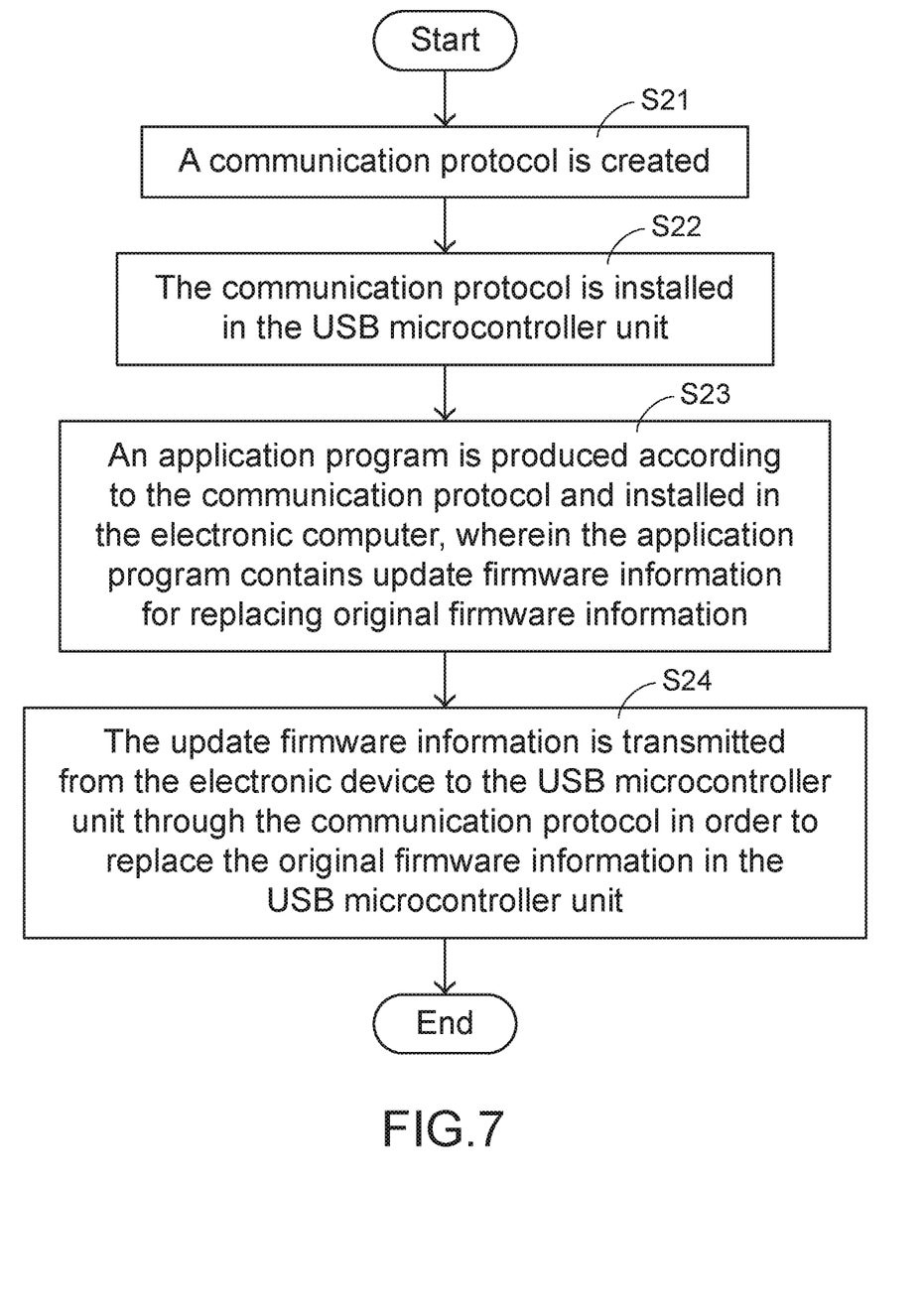
FIG. 7 is a flowchart illustrating a firmware updating method for a USB device according to another embodiment of the present invention.

FIG. 7 is a flowchart illustrating a firmware updating method for a USB device according to another embodiment of the present invention.

Firstly, in a step S21, a communication protocol 84 is created. Then, in a step S22, the communication protocol 84 is installed in the USB microcontroller unit 80. That is, the USB microcontroller unit 80 can perform communication through the communication protocol 84, which is created in the step S21. In a step S23, an application program 81 is produced according to the communication protocol 84. The application program 81 is installed in the electronic computer 9, and thus the electronic device 9 can perform communication through the communication protocol 84. The application program 81 produced in the step S23 contains update firmware information 83 for replacing original firmware information 82. In a step S24, the update firmware information 83 is transmitted from the electronic device 9 to the USB microcontroller unit 80 through the communication protocol 84 in order to replace the original firmware information 82 in the USB microcontroller unit 80. Especially, while the firmware updating method of FIG. 7 is performed, the USB device 8 is always considered as a human interface device (HID) by the electronic device 9.

Figure 8:
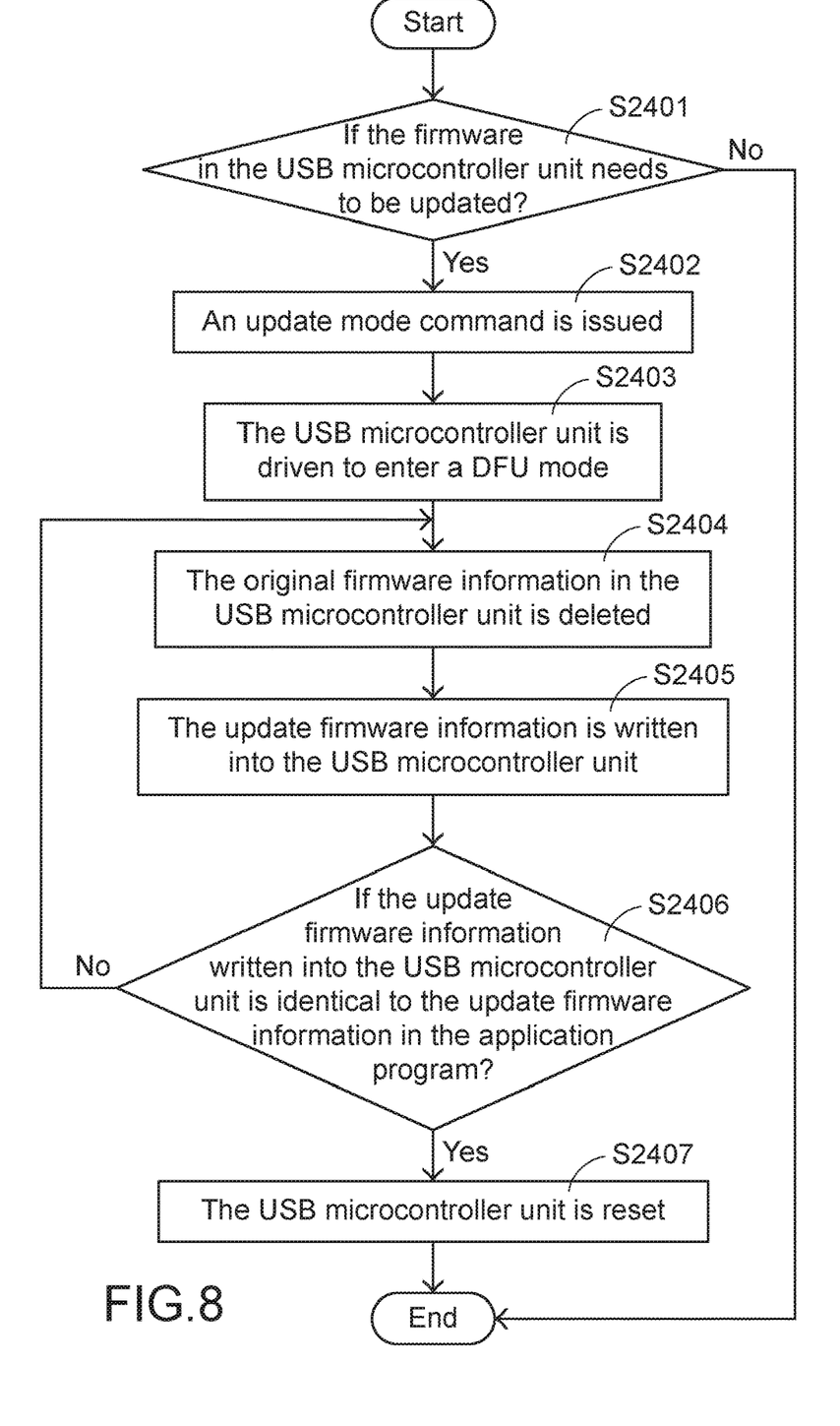
FIG. 8 illustrates the detailed procedure of the step S24 in the firmware updating method of FIG. 7.

The detailed procedure of the step S24 will be described as follows. FIG. 8 illustrates the detailed procedure of the step S24 in the firmware updating method of FIG. 7. While the user intends to update the firmware and the application program 81 installed in the electronic device 9 is executed, the application program 81 firstly judges whether the firmware in the USB microcontroller unit 80 needs to be updated (Step S2401 of FIG. 8). In an embodiment, the application program 81 judges whether the update firmware information 83 and the original firmware information 82 are identical. If the update firmware information 83 and the original firmware information 82 are different, the application program 81 judges that the firmware in the USB microcontroller unit 80 needs to be updated. Then, the application program 81 issues an update mode command (Step S2402 of FIG. 8). The update mode command is directly transmitted to the USB microcontroller unit 80 through the communication protocol 84, which is created in the step S21 of FIG. 8. Consequently, the USB microcontroller unit 80 is driven to enter a device firmware upgrade (DFU) mode (Step S2403 of FIG. 8).

Then, the original firmware information 82 in the USB microcontroller unit 80 is deleted by the USB microcontroller unit 80 (Step S2404 of FIG. 8). Then, the update firmware information 83 transmitted through the communication protocol 84 is written into the USB microcontroller unit 80 (Step S2405 of FIG. 8). After the update firmware information 83 is written into the USB microcontroller unit 80, at least one of the application program 81 and the USB microcontroller unit 80 will check whether the update firmware information 83 written into the USB microcontroller unit 80 is identical to the update firmware information 83 in the application program 81 (Step S2406 of FIG. 8). If the update firmware information 83 written into the USB microcontroller unit 80 and the update firmware information 83 in the application program 81 are identical, the USB microcontroller unit 80 is reset (Step S2407 of FIG. 8). Whereas, if the update firmware information 83 written into the USB microcontroller unit 80 and the update firmware information 83 in the application program 81 are different, the steps S2404, S2405 and S2406 are repeatedly done.

From the above descriptions, the technology of the present invention has the following benefits. Firstly, the USB microcontroller unit and the application program of the USB device are in communication with each other through a self-defined communication protocol. Consequently, it is not necessary to establish the temporary communication channel between the electronic computer and the USB microcontroller unit through the driver. By the technology of the present invention, the update firmware information can be directly transmitted from the electronic computer to the USB microcontroller unit. In other words, the firmware updating method of the present invention is simplified when compared with the conventional technology. Secondly, the USB microcontroller unit and other microcontroller units of the USB device are connected with each other through self-defined connection interfaces. Consequently, the update firmware information can be directly transmitted to the corresponding microcontroller units through the USB microcontroller unit in order to replace the original firmware information. Under this circumstance, it is not necessary to use an external cable to implement the firmware updating method. Thirdly, during the process of updating the firmware, the USB device is always considered as a human interface device (HID) by the electronic device. In accordance with the conventional technology, the USB device is considered as the COM-port computer peripheral device. The speed of transferring the firmware information between the USB microcontroller unit and the electronic computer according to the present invention is at least one hundred times the speed of the conventional technology.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A firmware updating method for a USB (Universal Serial Bus) device with at least one microcontroller unit, the firmware updating method comprising steps of:

(P1) creating a communication protocol;

(P2) installing the communication protocol in the at least one microcontroller unit, wherein the at least one microcontroller unit comprises first microcontroller unit containing a first original firmware information, a second microcontroller unit containing a second original firmware information and a USB microcontroller unit, wherein the USB microcontroller unit is connected with an electronic computer through a USB interface, connected with the first microcontroller unit through a first connection interface, and connected with the second microcontroller unit through a second connection interface, and the communication protocol is installed in the USB microcontroller unit;

(P3) producing an application program according to the communication protocol, wherein the application program is installed in the electronic computer, and the application program contains at least one update firmware information, wherein the at least one update firmware information contains a first update firmware information and a second update firmware information; and (P4) transmitting the first update firmware information from the application program to the first microcontroller unit through the USB microcontroller unit to judge whether the first original firmware information in the first microcontroller unit needs to be updated, wherein if the first original firmware in the first microcontroller unit needs to be updated, a sub-step (P41) is performed; and if the first original firmware in the first microcontroller unit does not need to be updated, transmitting the second update firmware information from the application program to the second microcontroller unit through the USB microcontroller unit to judge whether the second original firmware in the second microcontroller unit needs to be updated, wherein if the second original firmware in the second microcontroller unit needs to be updated, a sub-step (P42) is performed;

wherein the step (P41) comprising:

transmitting the first update firmware information to the USB microcontroller unit, and then writing the first update firmware information into the first microcontroller unit through the first connection interface, so that the first original firmware information is replaced by the first update firmware information; and the sub-step (P42) comprising:

transmitting the second update firmware information to the USB microcontroller unit, and then writing the second update firmware information into the second microcontroller unit through the second connection interface, so that the second original firmware information is replaced by the second update firmware information.

2. The firmware updating method according to claim 1, wherein the first connection interface is a UART (Universal Asynchronous Receiver/Transmitter) interface, an I2C (Inter-Integrated Circuit Bus) interface, a SPI (Serial Peripheral Interface Bus) interface or a USB interface.

3. The firmware updating method according to claim 1, wherein the second connection interface is a UART interface, an I2C interface, a SPI interface or a USB interface.

4. The firmware updating method according to claim 1, wherein when the first original firmware in the first microcontroller unit needs to be updated, the step (P4) comprises sub-steps of:

driving the first microcontroller unit to enter a device firmware upgrade mode; and deleting the first firmware information in the first microcontroller unit; and when the second original firmware in the second microcontroller unit needs to be updated, the step (P4) comprises sub-steps of:

driving the second microcontroller unit to enter a device firmware upgrade mode; and deleting the second firmware information in the second microcontroller unit.

5. The firmware updating method according to claim 4, wherein the step (P4) comprises a sub-step of checking whether the first firmware information and the second firmware information written into the first microcontroller unit and the second microcontroller are identical to the first update firmware information and the second update firmware information in the application program.

6. The firmware updating method according to claim 4, wherein the USB device is a human interface device (HID).

7. A wireless receiver module shared by a wireless mouse and a wireless keyboard, comprising:

a first microcontroller unit containing a first original firmware information, wherein when a signal from the wireless mouse is received by the wireless receiver module, the signal from the wireless mouse is processed by the first microcontroller unit;

a second microcontroller unit containing a second original firmware information, wherein when a signal from the wireless keyboard is received by the wireless receiver module, the signal from the wireless keyboard is processed by the second microcontroller unit;

a USB microcontroller unit connected with an electronic computer through a USB interface, connected with the first microcontroller unit through a first connection interface, and connected with the second microcontroller unit through a second connection interface; and an application program installed in the electronic computer, wherein the application program contains a first update firmware information and a second update firmware information, wherein the application program and the USB microcontroller unit have the same communication protocol, wherein during a process of updating a firmware of the USB device, the first update firmware information is directly transmitted from the application program to the USB microcontroller unit through the communication protocol and the first update firmware information is written into the first microcontroller unit through the first connection interface so as to replace the first original firmware information, or the second update firmware information is directly transmitted from the application program to the USB microcontroller unit through the communication protocol and the second update firmware information is written into the second microcontroller unit through the second connection interface so as to replace the second original firmware information.

8. The USB device according to claim 7, wherein the first connection interface is a UART (Universal Asynchronous Receiver/Transmitter) interface, an I2C (Inter-Integrated Circuit Bus) interface, a SPI (Serial Peripheral Interface Bus) interface or a USB interface.

9. The USB device according to claim 7, wherein the second connection interface is a UART interface, an I2C interface, a SPI interface or a USB interface.

* * * * *